United States Patent [19]

Hazan et al.

[11] Patent Number: 5,061,847
[45] Date of Patent: Oct. 29, 1991

[54] FORCE/PRESSURE DETECTION DEVICE UTILIZING A MONOMODE OPTICAL FIBER

[75] Inventors: Jean-Pierre Hazan, Sucy en Brie; Michel Steers, La Queue en Brie; Gilles Delmas, Epinay sous Senart; Jean-Louis Nagel, Limeil-Brevannes, all of France

[73] Assignee: U.S. Philips Corp., New York, N.Y.

[21] Appl. No.: 517,872

[22] Filed: May 2, 1990

[30] Foreign Application Priority Data

May 2, 1989 [FR] France ................................ 88 05802

[51] Int. Cl.$^5$ ................................................ H01J 5/16
[52] U.S. Cl. ............................ 250/227.17; 250/227.23
[58] Field of Search ................ 250/225, 227.17, 231.1, 250/227.21, 227.23, 226; 356/365, 367, 73.1, 33; 73/800, 705

[56] References Cited

U.S. PATENT DOCUMENTS

| | | | |
|---|---|---|---|
| 3,753,101 | 8/1973 | Aumont | 250/225 |
| 4,173,412 | 11/1979 | Ramsay et al. | 250/227.17 |
| 4,356,396 | 10/1982 | Ruell et al. | 250/227.23 |
| 4,442,350 | 4/1984 | Rashleigh | 250/227.17 |
| 4,492,860 | 1/1985 | Brogardh et al. | 250/227.23 |
| 4,554,449 | 11/1985 | Taniuchi et al. | 250/225 |
| 4,630,889 | 12/1986 | Hicks, Jr. | 350/96.3 |
| 4,642,458 | 2/1987 | Jackson et al. | 250/227.17 |
| 4,659,923 | 4/1987 | Hicks, Jr. | 250/227.17 |
| 4,737,027 | 4/1988 | Maeda | 356/73.1 |
| 4,749,854 | 6/1988 | Martens | 250/225 |
| 4,932,783 | 6/1990 | Kersey et al. | 250/227.17 |

Primary Examiner—David C. Nelms
Assistant Examiner—Michael Messinger
Attorney, Agent, or Firm—William L. Botjer

[57] ABSTRACT

A detection device for measuring force and pressure is disclosed which includes a monomode optical fiber (1) into which polarized light is fed and, at the output of the fiber, is detected by a detection arrangement (4, 80, 81, 30, 40, 31, 41), which is sensitive to the polarization of the light. The detection arrangement is provided with means (30A, 31A) for analyzing the light according to at least two different polarization directions, forming an angle comprised between 30° and 60° between them. According to the invention, the device is provided with means (70, 71, 2) for feeding several non-correlated light signals, each polarized differently, into the input of the fiber, and with means (4) for distinguishing between the light signals in the said detection arrangement at the output of the fiber, which light signals have been fed into the input of the fiber. The invention is applied in intrusion detection, monitoring and security systems.

13 Claims, 3 Drawing Sheets

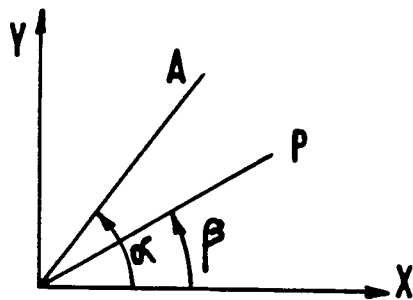
FIG.1
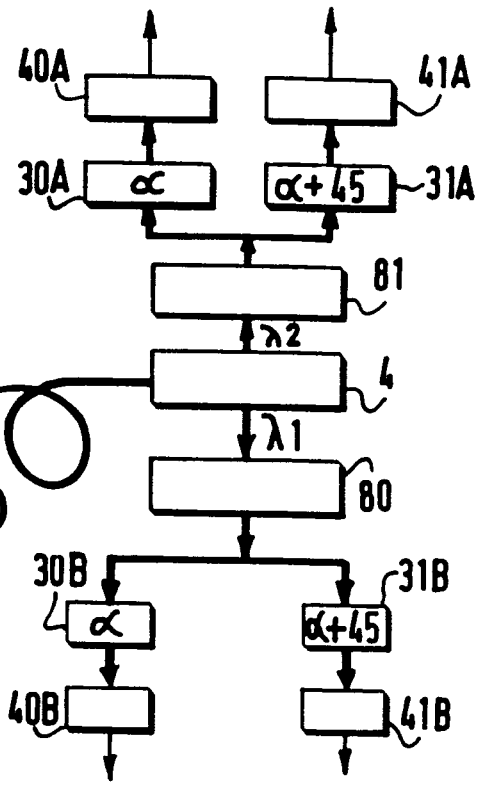
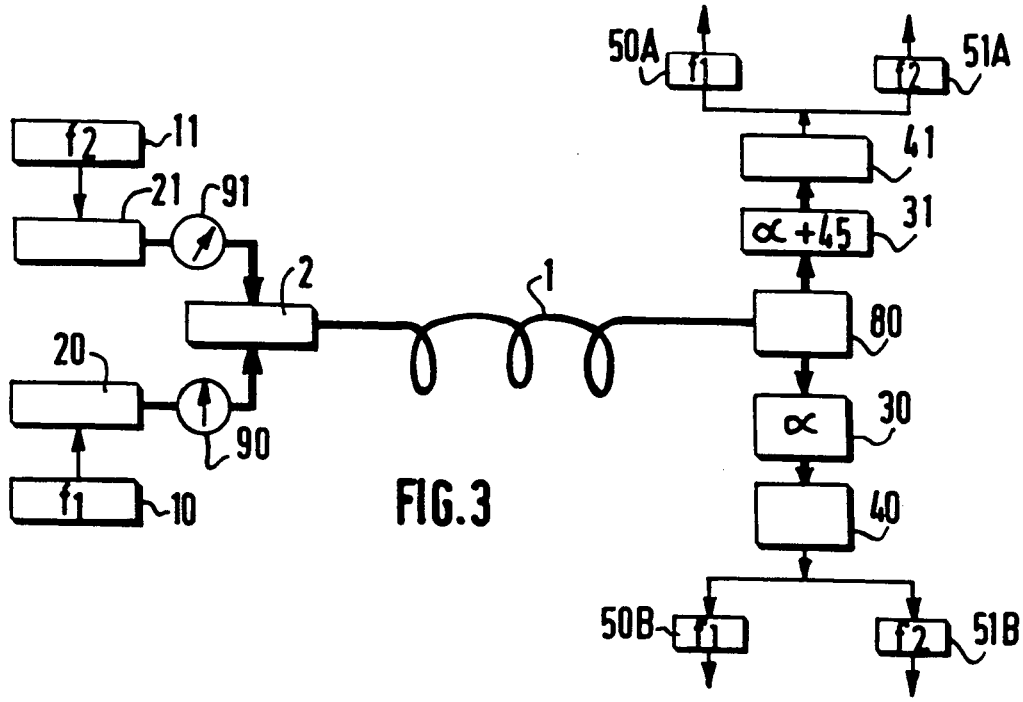
FIG.2
FIG.3

FORCE/PRESSURE DETECTION DEVICE UTILIZING A MONOMODE OPTICAL FIBER

BACKGROUND OF THE INVENTION

1. Field of the Invention

The present invention relates to a detection device for measuring force and pressure, provided with a monomode optical fiber, into which polarized light is fed and at the output of the fiber is received by a detection arrangement sensitive to the polarization of the light, the influence of the force or the pressure to be measured being substantially perpendicular to the longitudinal axis of the optical fiber and the detection arrangement being provided with means for analyzing the light in accordance with at least two different directions of polarization, together forming an angle comprised between 30° and 60°.

2. Description of Related Art

Detection devices of the type referred to above are based on the photo-elastic effect in a monomode fiber, i.e. the rotation of the polarization or the change in the ellipticity of the polarization in response to stress. These devices are used more specifically in intrusion detection, supervising and safety systems. The fiber is, for example, buried into the ground, following a perimetrical line outside buildings, to detect the presence of intruders even before they reach the buildings.

In the prior art, two devices arranged at 45° with respect to each other, were proposed to be arranged at the output of the fiber. Such a device is disclosed in EP-A-0,120,999 (FIG. 8 and the entire page 11). The reason for such an arrangement is that the device described in said document uses either a special fiber or a special treatment by twisting the fiber around its axis, in this case at the rate of 15-20 turns/meter. This twist must not change versus time, which would lead to false alarms and, furthermore, in the case of an intrusion on a place covered by one or more turns, would cause problems because a desensitization by compensation may occur.

It is furthermore interesting to conceive a system which functions with conventional monomode fibers. When such fibers are burried in the ground, the transmission of the stress load cannot be controlled perfectly and two types of phenomena may be observed without it being certain in advance which one will occur (moreover, there could be a combination of these two phenomena).

These two physical effects are:

a rotation of the polarization plane, for example, by torsion of the fiber.

a change in the state of the polarization obtained by compression, !or example a linear polarization then becoming elliptical, this effect being moreover very frequent: it is denoted birefringence through compression.

Thus, the transmission of a polarized light, injected at the input of the fiber and "analysed" at the output, is changed under the action of an intrusion.

Parasitic effect (imperfect fiber, thermal or mechanic effects) may modify the orientation and the shape of the polarization, both in space and in time, which might result in a very strong attenuation of the signal, commonly denoted "fading" by the expert.

SUMMARY OF THE INVENTION

The present invention has for its object to take precautions against these effects.

The problems to be solved are the following:

In cases in which there are no disturbances, in which the polarization is preserved and in which the polarization is linear at the input of the fiber, the first problem that arises is to find a configuration by means of which a correct and effective detection of both the rotation of the polarization plane and the birefringence through compression is made possible. A single orientation of the analyzer at the output of the system is not optimum and there should be at least two of them, one to detect the rotation of the polarization plane and the other to detect the birefringence through compression. It happens that these two orientations are at an angle of 45° relative to each other and not at an angle of 90° for the majority of the assemblies concern only one of these effects. Therefore, by a completely independent reasoning and for other reasons one is again led to the assembly described in the cited document.

In cases in which the parasitic effects cause the polarization plane to rotate downstream of the intrusion, effects will occur which are detrimental to the two observable types of birefringence. A good solution is to use two differently oriented analysers at the output. It turns out, by a fortunate coincidence, that for both cases the orientation should be approximately 45° (in between 30° to 60°) with respect to each other. Therefore, by using two analysers arranged at approximately 45° With respect to each other, three problems are solved simultaneously:

the efficient detection of the rotation of the polarization plane as well as the birefringence through compression (elliptization);

the solution of the effects of a parasitic rotation of the polarization plane;

the solution of the effects on the birefringence through compression of a parasitic rotation between the point of intrusion and the analyzer.

Unfortunately, not all problems are solved, in particular the effects of disturbances occurring upstream of the intrusion, such as the parasitic rotation of the polarization upstream of the point of intrusion for the birefringence through compression;

the parasitic deformation of the polarization (circulation) occurring at the point of intrusion: actually the rotation of a circular polarization cannot be detected.

In order to solve these problems simultaneously, the device according to the invention, is characterized, in that it is provided with means for entering into the input of the fiber, several non-correlated light signals which are each polarized in a different way, and means for distinguishing between the light signals which are entered into the input fiber in the said detection arrangement present at the output of the fiber. The expression "non-correlated" must be understood to mean that they cannot interfere with each other. To prevent two types of waves from interfering it is sufficient, for example, that:

they either originate from two different lasers, or do not coincide in time.

Advantageously, there are two light signals at the input; they are linearly polarized and they are arranged such that the plane of rotation of one light signal forms an angle comprised between 30° and 60° with the plane of rotation of the other one.

The two light signals may be obtained from two sources of different wavelength, in that case the means for distinguishing between the light signals in the detection arrangement are based on the wavelength of the light.

The two sources may also have the same wavelength, but then, in a first embodiment, they are each modulated by a different freguency, and the means in the detection arrangement for distinguishing between the light signals are based on the detection of the two different modulation frequencies.

According to a second embodiment, the two sources are alternately activated, and the means in the detection arrangement for distinguishing between the light signals are based on the use of time synchronization between the detectors and the source.

However, the two light signals may alternatively be obtained from a single source, followed by an electro-optical device, which is modified versus time. Then, the electro-optical device is advantageously a liquid crystal and the walls of the container of the liquid crystal are polished in two directions which are at an angle of 45° with respect to each other; in that case, the means in the detection arrangement for distinguishing between the lights are based on the use of time synchronization between the detectors and the electro-optical device.

BRIEF DESCRIPTION OF THE DRAWINGS

The following description which is given by way of non-limitative example with reference to the accompanying drawings will make it better understood how the invention can be put into effect.

FIG. 1 shows the definition of the different angles of the polarization planes occurring in the device.

FIGS. 2 to 5 each show schematically an alternative of the embodiment of the device according to the invention.

DESCRIPTION OF THE PREFERRED EMBODIMENTS

Figure 4:
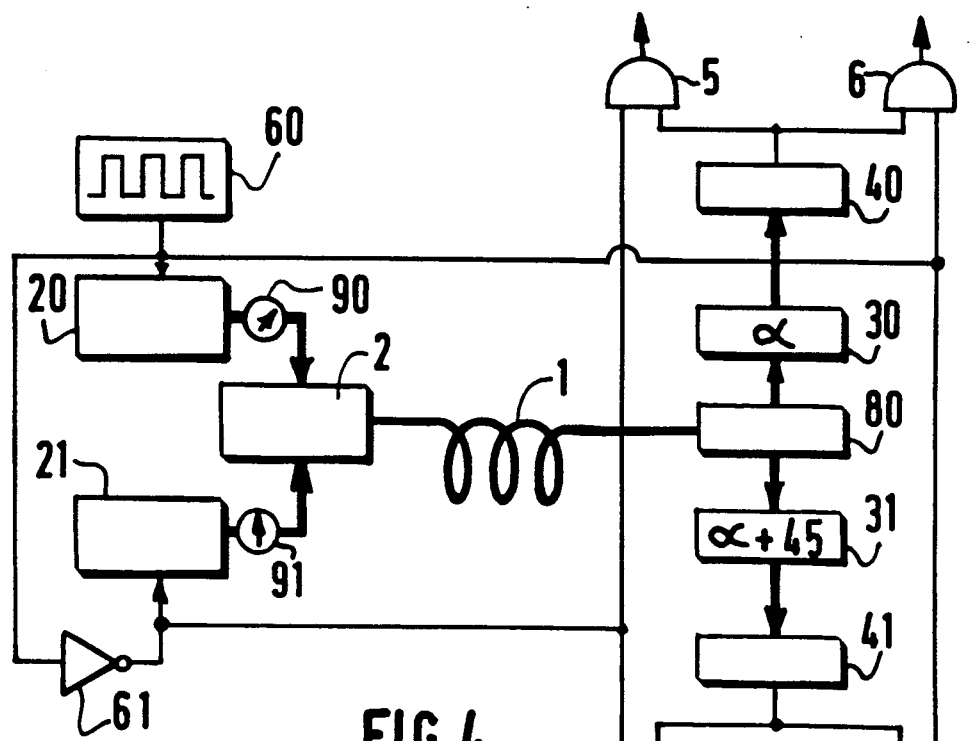

Now, by way of example, a description if given of an elementary system constituted by a source of linearly polarized light in a plane indicated by P in FIG. 1. This light is fed into a fiber. Let it be assumed for the time being that the fiber is perfect and is not subjected to stresses other than those to be detected. This stress creates locally a birefringence, whose large axis is the axis X in FIG. 1. Let it, finally, be assumed that at the output of the fiber an analyser is provided whose analysing plane is indicated by A. The respective planes A and P form the angles $\alpha$ and $\beta$ with the plane X.

In the absence of stress, Malus' law teaches that the current strength, detected by the analyzer is:

$$I = I_0 \cos^2(\beta - \alpha)$$

wherein $I_0$ is the maximum strength detected for $\beta = \alpha$.

If a force is applied along X, the induced birefringence creates a difference of sign between the planes X and Y resulting in a phase shift $\psi$, along the length L of the fiber, to which the stress is applied. By way of reminder:

$$\psi = (n_x - n_y) 2\pi L / \lambda$$

where $n_x$ and $n_y$ are the signs in accordance with the directions X and Y, and if $\lambda$ is the wavelength.

The normalized amplitude, entered at the input of the fiber, as a function of time, being equal to $\cos \omega t$, has for its components for X and Y:

$$X = \cos \beta \cdot \cos \omega t$$

$$Y = \sin \alpha \cdot \cos \omega t$$

If a phase shift $\psi$ is introduced by an intrusion in the direction Y with respect to the direction X then:

$$Y = \sin \beta \cdot \cos(\omega t - \psi)$$

The amplitude transferred by the analyzer is equal to:

$$A = X \cos \alpha + Y \sin \alpha \, i.e.$$

$$A = \cos \beta \cdot \cos \alpha \cdot \cos \omega t + \sin \alpha \cdot \sin \beta \cdot \cos(\omega t - \psi)$$

The detected current strength is $I \propto A^2$.
After some trigonometrical operations, $$I \propto \cos^2(\alpha - \beta) - \sin 2\alpha \cdot \sin 2\beta \cdot \sin^2(\psi/2)$$

is obtained. The term $\cos^2(\alpha - \beta)$ represents the strength during the absence of stress, and the term $\sin 2\alpha \sin 2\beta \sin^2(\psi/2)$ represents the variation of the current strength due to the stress. This variation itself is composed of two terms one of which $f = \sin^2(\alpha/2)$ is caused by the intrusion and the other is a multiplying geometrical coefficient which depends on the orientation of the analyser and the polarizer with respect to the force. The terms $\sin 2\alpha$ and $\sin 2\beta$ play symmetrical roles. For the time being let it be assumed that $\sin 2\alpha = 1$.

It would seem that it is sufficient to arrange the analyzer and the polarizer in such a way that each of the angles $\alpha$ and $\beta$ has a value of 45° or 135° to obtain the highest sensitivity. However, the presence of natural parasitic stresses may cause changes in the polarization state, Which thus becomes unknown a priori, at the location where the force is applied.

In the case of a parasitic rotation of the polarization plane upstream of the place of application of the intrusion force, there is a risk that this rotation be such that $\sin 2\beta$ is close to or equal to 0, which will lead to a very strong "fading". To prevent this effect from occurring, the device according to the invention is provided with means to feed-in, not one but two non-correlated waves having polarizations which relative to each other are directed at an angle $\beta_0$.

For a given birefringence, there are consequently two signals, one of which is modified by a multiplying coefficient $\sin 2\beta$ and the other by a coefficient $\sin 2(\beta + \beta_0)$. If for example $\beta_0 = 45°$ and $\beta = 0$, then $\sin 2\beta = 0$, but $\sin 2(\alpha + 45°) = 1$. It is sufficient that one of the signals exceeds a given threshold to trigger the alarm. It should however be noted, that if the two signals are to be added together before comparing them to a threshold, it is advisable to take the absolute values and the multiplying coefficient becomes $|f \cdot \sin 2\beta| + |f \cdot \sin 2(\beta + \beta_0)|$. This addition of the absolute values can be performed with the aid of known analog or digital means.

Figure 6:
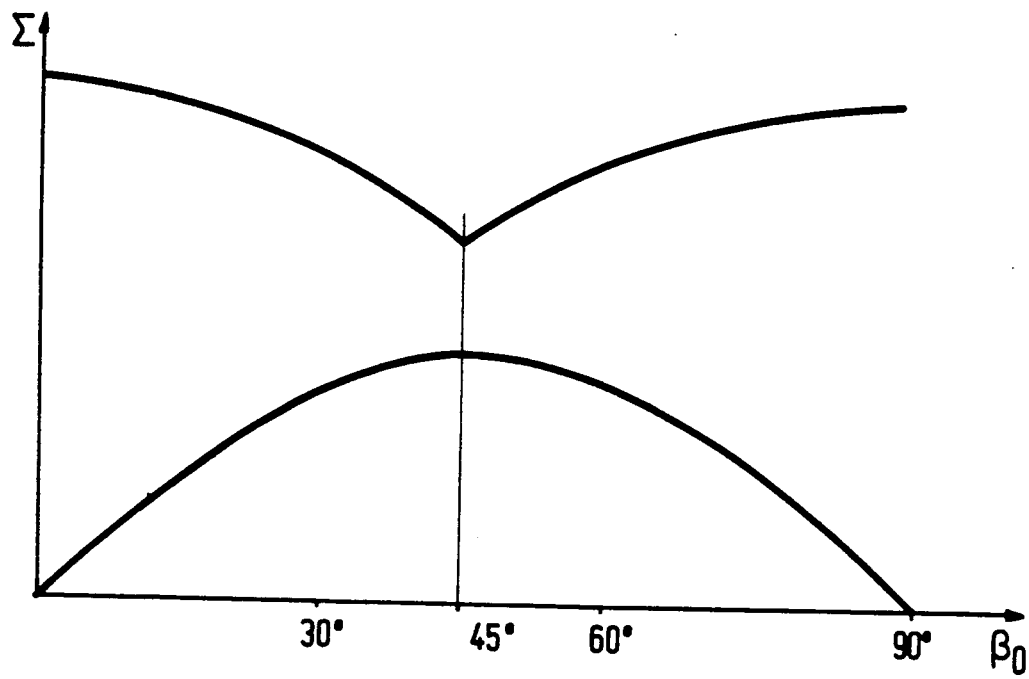
FIG. 6 is a curve representing the sum of the signals, originating from the two analysers as a function of their difference in orientation.

In FIG. 6, the Y-axis represents the value of that sum of absolute values having $\beta_0$ at the abscissa. The upper and lower curves, respectively, represent the place of the maximum and the place of the minimum the value of the said sum can reach when $\beta$ varies in a random manner between 0° and 360° for a fixed $\beta_0$. For $\beta_0 = 0°$ or 90°, the minimum (lower curve) is zero, which is prohibitive. For $\beta_0 = 45°$ the minimum is optimum, and between $\beta_0 = 30°$ and $\beta_0 = 60°$ it is less so. Therefore, $\beta_0$ is chosen between these two values.

Being given that the terms $\sin 2\alpha$ and $\sin 2\beta$ play symmetrical roles, the same conclusion also holds for the output analyzers, and explains the importance of positioning these analyzers also with a relative orientation of approximately 45°.

The different manners of utilising injection of two non-correlated polarizations, arranged at an angle of 45° with respect to each other, are described in detail hereinafter.

Up to now it has been assumed that the input polarization was linear and remained so up to the point of intrusion. Unfortunately, the conventional monomode fibers poorly preserve the polarization and a circular polarization may very well be found at the point of intrusion.

Therefore, an intrusion which will cause a rotation of the polarization will not be detectable, since the rotation of a circular polarization cannot be detected.

The injection of two non-correlated, rectilinear polarizations, directed at $\pi/4$ with respect to each other, also allows to overcome this difficulty.

Indeed, for a linear vibration to be converted into a circular vibration after having passed through a medium (the fiber in the present case), the fiber must:

on the one hand act as a plate producing a phase shift of $\pi/2$, and denoted quarter-wave plate (abbreviated to: $\lambda/4$ plate)

on the other hand have its axes directed at 45° with respect to the incident rectilinear vibration.

In contrast thereto, a rectilinear vibration, parallel to one of the two axes, will pass through the environment without elliptization Thus, if a fiber becomes birefringent in the course of time and/or upstream of the intrusion in response to a parasitic effect, in such a manner that it can be compared to a parasitic $\lambda/4$ plate the axes of which have an orientation which is not known a priori this fiber will render a linear vibration, which is incident at an angle of 45°, from its axis circular, wherein it will not modify a vibration parallel to one of its axes.

Thus, if only a single wave having a rectilinear polarization is fed in, there is a risk that it may become (quasi) circular at the point of the intrusion and, as has been indicated, the intrusion will hardly be detectable if it causes a rotation of the polarization.

In contradistinction thereto, if two non-correlated polarizations, directed at 45° with respect to each other, are fed-in, one will remain rectilinear or a flattened ellipse and will be easily detectable, if the other becomes circular. The "fading" will then be limited.

The feed-in of the two non-correlated polarizations, which are at an angle of approximately 45° with respect to each other, will then allow solving both the problem of the rotation of a rectilinear polarization upstream of the intrusion for the detection of a birefringence through compression and the problem of the modification of the shape of the vibration (circularization) in the case of an intrusion causing a rotation of the polarization.

The two waves must be non-correlated: this is a very important point, because should the waves be correlated, it would be tantamount to the feed-in of a single wave of an intermediate orientation, which, dictated by the disturbances, might turn out to be poorly oriented.

Finally, several directions of the polarization are "multiplexed" at the input and several analyzers at the output, while carefully avoiding relative angles of 0° or 90° between the polarizers as well as between the analyzers.

A first variation of a device according to the invention is shown in FIG. 2. This device comprises two lasers 70, 71, each one emitting light of a different wavelength, for example 0.8 $\mu$m and 0.85 $\mu$m, or also 1.25 $\mu$m. The light coming from laser 70 passes through a linear polarizers 90, which is arranged in accordance with a first direction in the plane perpendicular to the light beam The light coming from laser 71 passes through a further linear polarizer 91, which is arranged in accordance with a second direction, rotated through 45° with respect to the first.

The two polarized light signals are added together in a coupler 2 and fed into the fiber 1. This fiber is preferably a fiber which has the following characteristics: the core has a diameter of the order of 5 $\mu$m, with a numerical aperture of the order of 0.15 radians. It is provided With a coating, Which to the best possible extent, shall not introduce natural stresses (for example due to the temperature) and must transmit the external compressions in a reproducible manner.

A separator 4 which splits the beam in two subbeams, according to wavelength, is arranged at the output of the fiber. Such a separator is based in known manner on the use of a prism, or a grating, or a wavelength-selective mirror.

Each of the two beams of different wavelengths, is conveyed to a splitter 80, 81 respectively The splitters split the beam into two beams: these separators are, for example, semireflecting mirrors, which transmit one part of the light and reflect another part. Systems of the type as those used in digital optical disc readers may be used to that effect, to separate one part of the laser beam for the purpose of servo-control. One of the two beams thus created from the beam of the first wavelength is conveyed to a polarizing analyzer 30A and the other of the two beams is conveyed to a polarizing analyzer 31A. The orientations of the two analyzers 30A and 31A differ 45° with respect to each other.

The two beams of the second wavelength are conveyed in a similar manner to two analyzers 30B, 31B, which are at an angle of 45° relative to each other Each light signal coming from one of the analyzers 30A, 31A, 308, 31B is conveyed to a light amplitude detector denoted 40A, 41A, 40B, 41B, respectively, and ultimately the four values supplied by the four detectors are added together (in absolute value) in a circuit (not shown), of any suitable type.

In the variations shown in the following Figures, elements having the same functions are given the same reference numerals.

The thick lines relate to light paths and the thin lines to electric paths.

The device of FIG. 3 comprises two identical lazers 20, 21. Their light outputs have the same wavelength. Each of them is amplitude-modulated by a modulator 10, 11, respectively. The modulators supply, for example, sinusoidal modulation signals. The modulation frequency must be higher than the frequency of the amplitude variations which are likely to be produced by an intrusion, i.e. by a stress to be detected, applied to the fiber. The typical intrusion passbands are of the order of 0.1 to 10 Hz. Therefore the modulation frequency should be at least equal to several tens of Hz.

The two light signals coming from the lazers 20, 21 are added together in a coupler 2 as in the foregoing, and are fed into the fiber 1. At the output of the fiber, the light is split into two beams, by a splitter 80 (provided with a semi-reflecting mirror) and each of the two light signals issuing from the splitter 80 is conveyed to an analyzer 30, 31, arranged at an angle of 45° relative to each other. Each of the analyzers is followed by an amplitude detector 40, 41 and the electric signal supplied by the detectors 40, 41 is conveyed to the electric bandpass filters 50A, 51A, 508, 518. The filters 50A, 50B have a center frequency equal to that of, for example, the modulator 10, and the filters 51A, 51B have a center frequency corresponding to that of the modulator 11. The frequencies and the passbands of the filters are of course chosen in such a manner that it is possible to split the information supplied by the lasers 20 and 21 in a reliable manner more specifically, it should be avoided that one of the frequencies is a harmonic of the other.

Finally, the absolute values of the electric signals supplied by the filters are added together, as in the preceding case The device of FIG. 4 is very much alike to the device shown in FIG. 3. The elements 20, 21, 2, 1, 80, 30, 31, 40, 41 are identical. Only the modulators and the filters are different. The demodulation source is here a square-wave generator which controls the laser 21. A logic inverter 61 transmits the inverted modulation signal to the laser 2.

Gates 5, 6, 7, 8 are arranged at the output of the amplitude detectors 40, 41. The gates 6 and 7 are controlled, i.e. opened or closed, by the modulation signal supplied by the generator 60 and allow the signal corresponding to laser 21 to pass. The frequency of the square-wave signal is, also in this case, chosen to be higher than the intrusion frequencies.

As in the foregoing, the absolute values of the signals coming from the gates 5-8 are added together.

Figure 5:
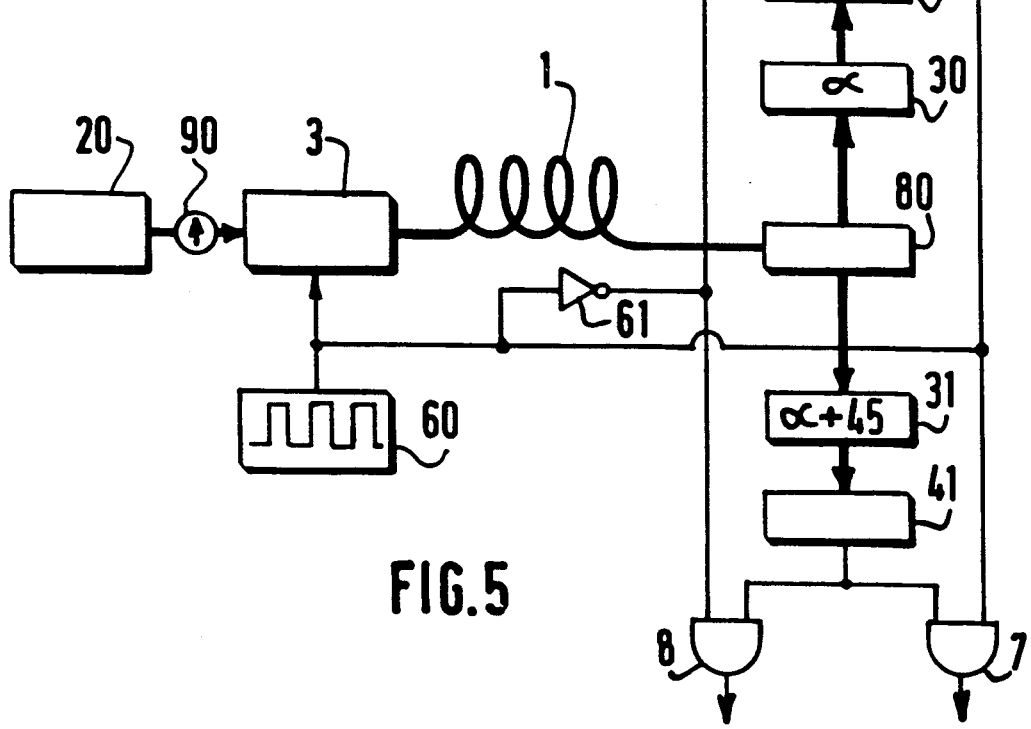

Finally the device of FIG. 5 comprises only one laser 20. This facilitates feeding light into the fiber, the diameter of which is very small: consequently, feeding several light signals might cause problems as regards mechanical precision. Besides saving a laser, this device also saves a coupler, which is an expensive element.

The laser light passes through a linear polarizer 90, thereafter through an electro-optical cell 3 which has for its object to rotate the polarization plane in response to an electric control voltage. This cell may be one of the known types for acting on the light, for example a Faraday cell; but cell 3 preferably is a liquid crystal cell: such a crystal is in fact particularly easy to control and consumes only little energy. The liquid crystal is placed in a container having transparent parallel walls, for example made of glass, through which the light passes. It is known that the micro-grooves, resulting from polishing the walls or the use of planar orientation layers deposited on these walls, allow for obtaining an appropriate orientation of the crystal molecules. In the present case, directions of orientation at an angle of 45° with respect to each other are used for the two walls of the cell, to facilitate the orientation of molecules to one or the other of the two directions.

The electric voltage applied to the cell 3 is supplied by a square-wave signal generator 60. In all further respects the device is similar to that shown in FIG. 4. More specifically, the signal of the generator controls the gates 6 and 7, and a signal inverted by the inverter 61 controls the gates 5 and 8.

Figure 7:
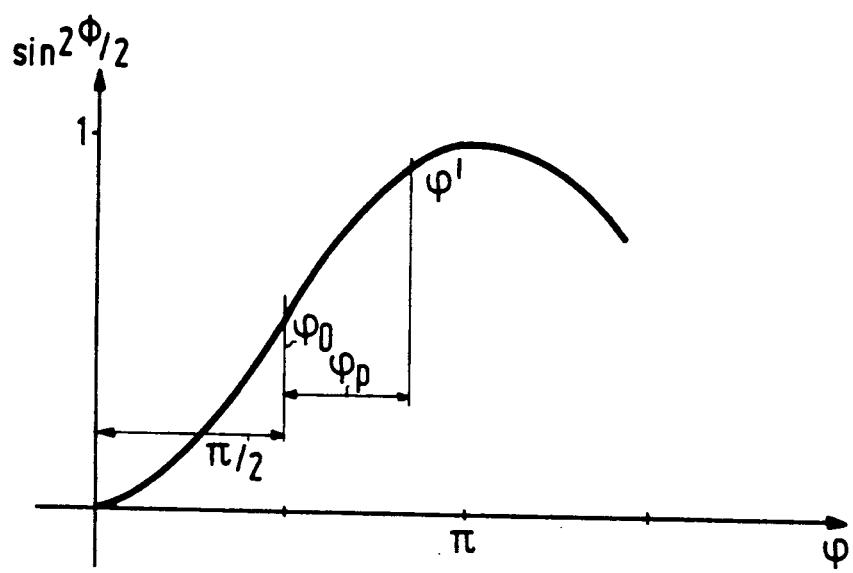
FIG. 7 is a curve illustrating the effect of a λ/4-plate placed before the detection device.

The signal produced in response to a compression force is proportional to $\sin^2 \psi/2$. The signal is very weak for small forces and is then approximately equal to $\psi^2/4$. To increase the sensitivity, a so-called $\lambda/4$ plate may be added, which adds a phase shift of $\pi/2$ so as to obtain an operating point $\psi_0$ (FIG. 7), which in the absence of disturbances is located in a quasi-linear part of the curve $\sin^2 \psi/2$. In contrast thereto, the operating point is $\psi = \psi_0 + \psi_p$ in the case of a disturbance causing a parasitic phase shift of $\psi_p$. If, accidentally $\psi_p$ is equal to $\lambda/2$, $\pi$ is still placed in a point zero sensitivity; then there should be no $\lambda/4$ plate. Taking these considerations into account, it is advantageous to divide the beam before this input into the detection arrangement and to add a $\lambda/4$-plate to the supplementary separated beam, followed by a linear polarization analyzer of 45° to the axis of the plate (the arrangement is also called a circular analyzer), which itself is followed by a detection arrangement similar to that described in the foregoing and capable of distinguishing between the two lights emitted at the input (the whole additional device is not shown for simplicity of the Figure), all this while retaining the two above-described detection arrangements at the input, incorporating the two detectors arranged at a relative angle of 45°.

Of course, variations differing from the above examples may be used. For example, though a laser is the ideal type of source for an optical fiber, it is not impossible to utilize other known types of sources. A mirror may alternatively be placed at the end of the fiber, and detection systems at the same end as the light sources, with a semi-reflecting system for separating the input light from the output light. Besides, instead of adding the output signals together, it is possible to supply a separate variation detector (i.e. an intrusion detector) from each of the signals, and to provide a logic OR-circuit which supplies an information when one of the four detectors detects an intrusion.

As far as the detection system is concerned, instead of using a separator 80, 81 the light beam may also alternately be reflected at the output, by means of a mechanical or acousto-optical effect, to two analyzers arranged at 45° relative to each other, each analyzer being followed by one or more detectors and thus forming an independent analyzing path. The deflection frequency must be high, with respect to a potential intrusion, so that it can be sampled correctly. The passbands corresponding to an intrusion are typically some Hz wide (<10 Hz). A liquid-crystal electro-optical cell of the fast switching type (relative to the intrusion) which, when a voltage is applied allows one direction of polarization to pass, and shifts the polarization through 45° with respect to the preceding polarization when another voltage is applied, could alternatively be used The light thus analyzed will be conveyed to one or more light detectors which will be followed by an electronic change-over circuit, having paths which are in synchronism with the excitation of the electro-optical cell. The intrusion signal will then be "sampled" by each of the two paths. The liquid crystal cell plays the part of a polarization plane "rotator", this polarization remaining linear. A device modifying the polarization shape (elliptization) could not be very suitable. Of course, the switching circuits thus associated with the analyzers will optionally be added to those described in the foregoing, and be in synchronism with the light changes at the input, and that totally independent.

Because of the arrangements of the invention, fiber sections burried in the ground, having a length of several hundreds of meters may be used, permitting a reliable detection of forces of the order of a few hundreds of newtons or even less, applied to the ground.

We claim:

1. A force/pressure detection device, having a monomode optical fiber having an input, an output and a longitudinal axis, the direction of the force or the pressure being nearly perpendicular to the longitudinal axis of the optical fiber, said device having means for feeding polarized light into the fiber and for receiving that light by a detection arrangement sensitive to the direction of polarization of the light at the output of the fiber, and provided with means for analyzing the light according to polarization directions, forming between them an angle between 30° and 60°, characterized in that the device is provided with means for feeding several non-correlated light signals, each polarized differently, into the input of the fiber, and at the output of the fiber there is provided means for distinguishing, in the detection arrangement, between the light signals fed into the fiber at the input.

2. A detection device as claimed in claim 1, characterized in that the polarized light feeding means comprise means for feeding linearly polarized light signals into the input.

3. A detection device as claimed in claim 2, characterized in that the polarized light feeding means comprise means for feeding into the input two light signals which are arranged so that the polarization plane of one light signal is disposed at an angle between 30° and 60° to the polarization plane of the other.

4. A detection device as claimed in one of claim 1, 2 or 3, characterized, in that the light feeding means contains two sources for obtaining the light signals having different wavelengths, and in that the means for distinguishing between the light signals in the detection arrangement are based on the wavelength of the light.

5. A detection device as claimed in claim 1, 2 or 3 characterized in that the light feeding means contains two sources for obtaining the light signals, which are each modulated by a different frequency and in that the means for distinguishing between the light signals in the detection arrangement are based on the detection of the modulation frequency.

6. A detection device as claimed in claim 1, 2 or 3, characterized in that it contains two sources for obtaining the light signals which are alternately activated and in that the means for distinguishing between the light signals in the detection arrangement are based on the use of a time-synchronization between the detectors and the sources.

7. A detection device as claimed in claim 1, 2 or 3 characterized in that it contains a sole source for obtaining the light signals, which sole source is followed by an electro-optical device, modulated in time.

8. A detection device as claimed in claim 7, characterized in that the electro-optical device is a Faraday cell.

9. A detection device as claimed in claim 7, characterized in that the electro-optical device is a liquid crystal.

10. A detection device as claimed in claim 9, characterized in that the liquid crystal is disposed within a container having walls which are provided with directional bonding layers for molecules, which layers are deposited according to two directional directions which enclose an angle of 45° with respect to each other.

11. A detection device as claimed in claim 7, characterized in that the means for distinguishing between the light signals are based on the use of a time synchronization between the light sources provided by the electro-optical device.

12. A detection device as claimed in claim 1, characterized in that the polarized light feeding means include means for dividing the beam into first and second beams before it is inputted into the fiber and in that a circular analyzer is arranged in the second beam, followed by an additional detection arrangement.

13. A detection device as claimed in claim 1, wherein said detection device is disposed beneath a surface so as to detect a force applied to said surface.

* * * * *